(12) United States Patent
Shimazaki (10) Patent No.: US 6,396,595 B1
(45) Date of Patent: May 28, 2002

(54) METHOD OF AND APPARATUS FOR COLOR CONVERSION DATA

(75) Inventor: Osamu Shimazaki, Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/115,510

(22) Filed: Jul. 15, 1998

(30) Foreign Application Priority Data

Jul. 17, 1997 (JP) ............................................... 9-192533

(51) Int. Cl.⁷ ................................................. B44C 1/16
(52) U.S. Cl. ........................ 358/1.9; 358/520; 358/530; 382/167
(58) Field of Search ........................... 382/167; 358/1.9, 358/520, 529, 530, 523

(56) References Cited

U.S. PATENT DOCUMENTS 5,121,196 A * 6/1992 Hung ........................... 358/75
5,177,603 A * 1/1993 Kojima ......................... 358/80
5,719,956 A * 2/1998 Ogatsu ......................... 382/167

OTHER PUBLICATIONS

Microsoft Press Computer Dictionary Third Edition, 1997.*

* cited by examiner

*Primary Examiner*—Thomas D. Lee
*Assistant Examiner*—Kevin Kianni
(74) *Attorney, Agent, or Firm*—Sughrue Mion, PLLC (57) ABSTRACT

Three-dimensional color conversion characteristics j=Rj(C, M, Y)(j=C', M', Y') and one-dimensional color conversion characteristics Rk(K1) are determined to equalize calorimetric values of a test chart T1 of color image data C, M, Y, f using a K plate function f(C, M, Y) with calorimetric values of a test chart T2 of color image data C, M, Y, K produced by a color output apparatus. Using these determined color conversion characteristics, color image data C, M, Y, K are converted into color image data C', M', Y', K'.

7 Claims, 7 Drawing Sheets

METHOD OF AND APPARATUS FOR COLOR CONVERSION DATA

BACKGROUND OF THE INVENTION

1. Field of the Invention

The present invention relates to a method of and an apparatus for generating color conversion data to convert color image data C, M, Y, K which are used to produce a printed material into color image data C', M', Y', K' which are used in a color output apparatus to equalize the colors of the printed material with the colors of a color image produced by the color output apparatus.

2. Description of the Related Art

Before producing a colored print with a color printing machine such as a rotary press, a color proof image is generated by a color output apparatus such as a DDCP (Direct Digital Color Proofing System), and examined and corrected. Such a color output apparatus makes it unnecessary to use platemaking films and press plates for proofreading, and hence makes the proofreading process highly efficient.

Color output apparatus for producing color images based on color image data of four colors C, M, Y, K need to effect a color conversion process on given color image data of C, M, Y, K in order to produce color images which represent the colors of final prints highly accurately.

Specifically, predicting the colors of final prints with a color printer needs various conversion tables, including a printing condition correcting conversion table for converting color image data in view of printing conditions (e.g., the type of the print paper used, and the type of inks used) of a color printing machine, a standard color conversion table for making standard color corrections depending on the output principles (e.g., halftone dot modulation or density modulation) of the color printer and the color printing machine, independently of the printing conditions, and a calibration conversion table for correcting individual characteristics of the color printer, the environment in which the color printer is used, and characteristic changes due to aging of the color printer. Using these conversion tables, it is possible to produce color images easily which are highly accurately predictive of the colors of final printed materials.

When dealing with color image data of four colors C, M, Y, K, each of the printing condition correcting conversion table and the calibration conversion table can easily be determined as a one-dimensional conversion relationship between monochromatic colors. However, because the standard color conversion table represents a highly precise four-dimensional conversion relationship between four colors, various problems arise in the determination of the standard color conversion table, as described below.

Heretofore, a standard color conversion table is produced as follows: A reference print paper and reference inks are selected, and a test chart composed of color patches is produced by a color printing machine of desired output principle using the reference print paper and the reference inks, after which the colorimetric values of the test chart are measured. Another test chart is produced by a reference color printer from the color image data of C, M, Y, K based on which the test chart has been produced by the color printing machine, and the calorimetric values of the test chart are measured. A table capable of equalizing the colorimetric values of the test charts is determined as the standard color conversion table.

The standard color conversion table, the printing condition correcting conversion table, and the calibration conversion table may be combined into a desired conversion table for incorporation into a color printer. However, since the amount of data of these conversion tables is huge, it takes a considerable period of time to combine these conversion tables.

If there are 11 items (10 halftone dot % intervals) of each of the color image data of C, M, Y, K, then the total number of color patches of a test chart required to generate a standard color conversion table will be $11^4=14641$. It also takes a considerable period of time to measure the colorimetric values of all these color patches.

SUMMARY OF THE INVENTION

It is a major object of the present invention to provide a method of and an apparatus for generating a minimum required amount of color conversion data, which requires a relatively small storage capacity for storage, within a relatively short period of time, the color conversion data being capable of highly accurate color conversion at high speed.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
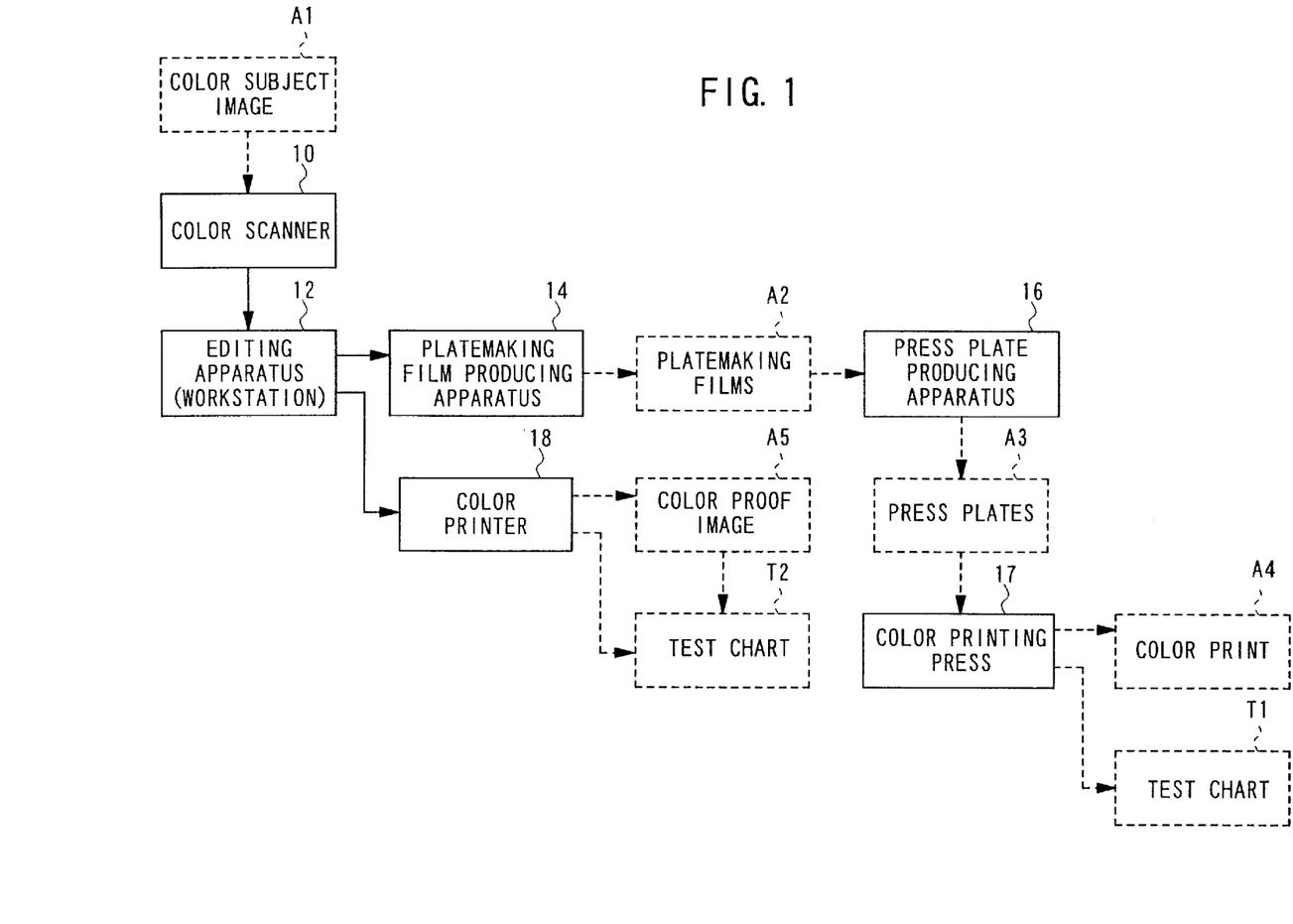
FIG. 1 is a block diagram of a system for generating a color proof image and a colored print.

FIG. 1 shows in block form a system for generating a color proof image and a colored print. A method of and an apparatus for generating color conversion data according to the present invention are applied to the system shown in FIG. 1.

As shown in FIG. 1, a color subject image A1 read by a color scanner 10 is edited for desired image processing layout settings, etc. by an editing apparatus 12 (workstation), generating color image data of four colors C, M, Y, K. The generated color image data are supplied to a platemaking film producing apparatus 14, which produces platemaking films A2. A press plate producing apparatus 16 produces press plates A3 of C, M, Y, K from the platemaking films A2. Using the press plates A3, a color printing machine 17 generates a color print A4 with desired inks and print paper.

Prior to the generation of the color print A4, the editing apparatus 12 supplies the color image data of four colors C, M, Y, K to a color printer 18, which generates a color proof image A5 for the operator to review and establish optimum conditions for generating the desired color print A4. The color printer 18 incorporates therein color conversion data capable of producing the color proof image A5 that is predictive of the color print A4 highly accurately, using a test chart T1 generated using the platemaking film producing apparatus 14, the press plate,producing apparatus 16, and the color printing machine 17, and a test chart T2 generated using the color printer 18.

Figure 2:
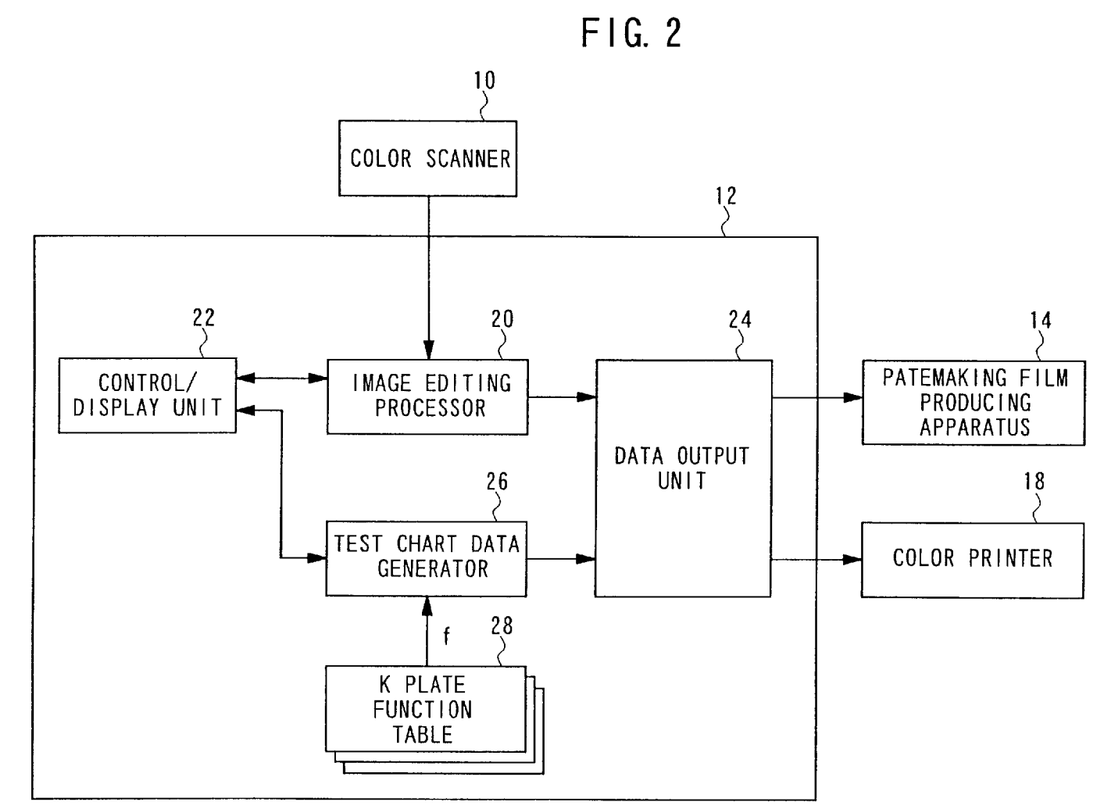
FIG. 2 is a block diagram of an editing apparatus of the system shown in FIG. 1.

FIG. 2 shows in block form the editing apparatus 12 of the system shown in FIG. 1. As shown in FIG. 2, the editing apparatus 12 comprises an image editing processor 20 for editing the color image data of four colors C, M, Y, K supplied from the color scanner 10, a control/display unit 22 operable by the operator to enter editing instructions into the image editing processor 20 using a display unit, a keyboard, a mouse, etc., a data output unit 24 for outputting the edited color image data to the platemaking film producing apparatus 14 or the color printer 18, a test chart data generator 26 for generating the test charts T1, T2, and a K plate function table 28 of a function relative to the color K which is used to generate the test chart T1 as a printed material.

Figure 3:
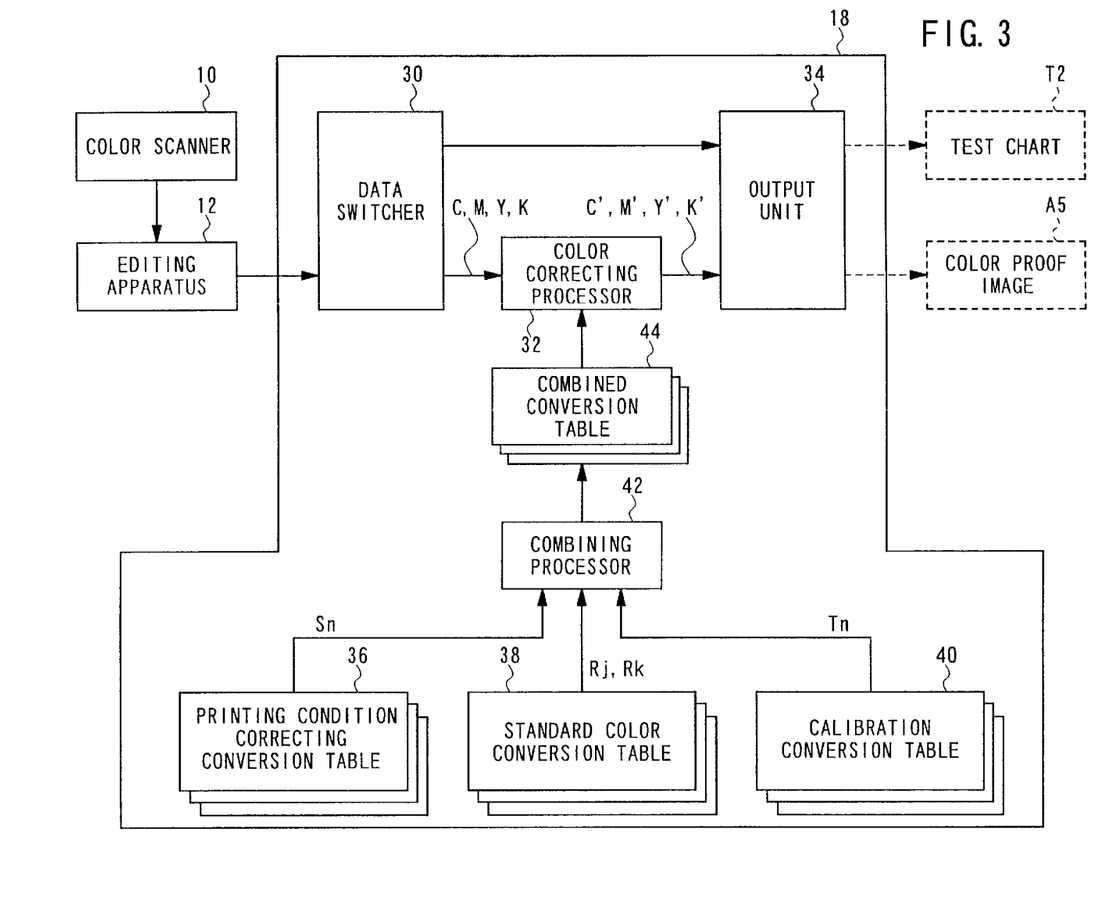
FIG. 3 is a block diagram of a color printer of the system shown in FIG. 1.

FIG. 3 shows in block form the color printer 18 of the system shown in FIG. 1. As shown in FIG. 3, the color printer 18 has a data switcher 30 for selectively switching test chart data supplied from the editing apparatus 12 and color image data of the color subject image A1, a color correcting processor 32 for effecting a color correcting process on the color image data using color conversion data established depending on printing conditions, output principles, and individual characteristics peculiar to the color printer 18, and an output unit 34 for generating the test chart T2 or the color proof image A5 from the test chart data or the color-corrected color image data.

The color printer 18 also has a printing condition correcting conversion table 36, a standard color conversion table 38, and a calibration conversion table 40. Color conversion data of these conversion tables 36, 38, 40 are combined by a combining processor 42 into combined color conversion data, which is then placed in a combined conversion table 44. The printing condition correcting conversion table 36 is a conversion table for converting color image data in view of printing conditions (e.g., the type of the print paper used, and the type of inks used) of the color printing machine 17. The standard color conversion table 38 is a conversion table for making standard color corrections depending on the output principles (e.g., halftone dot modulation or density modulation) of the color printer 18 and the color printing machine 17, independently of the printing conditions. The calibration conversion table 40 is a conversion table for compensating for color printer type differences, different environments in which the color printer 18.

Figure 4:
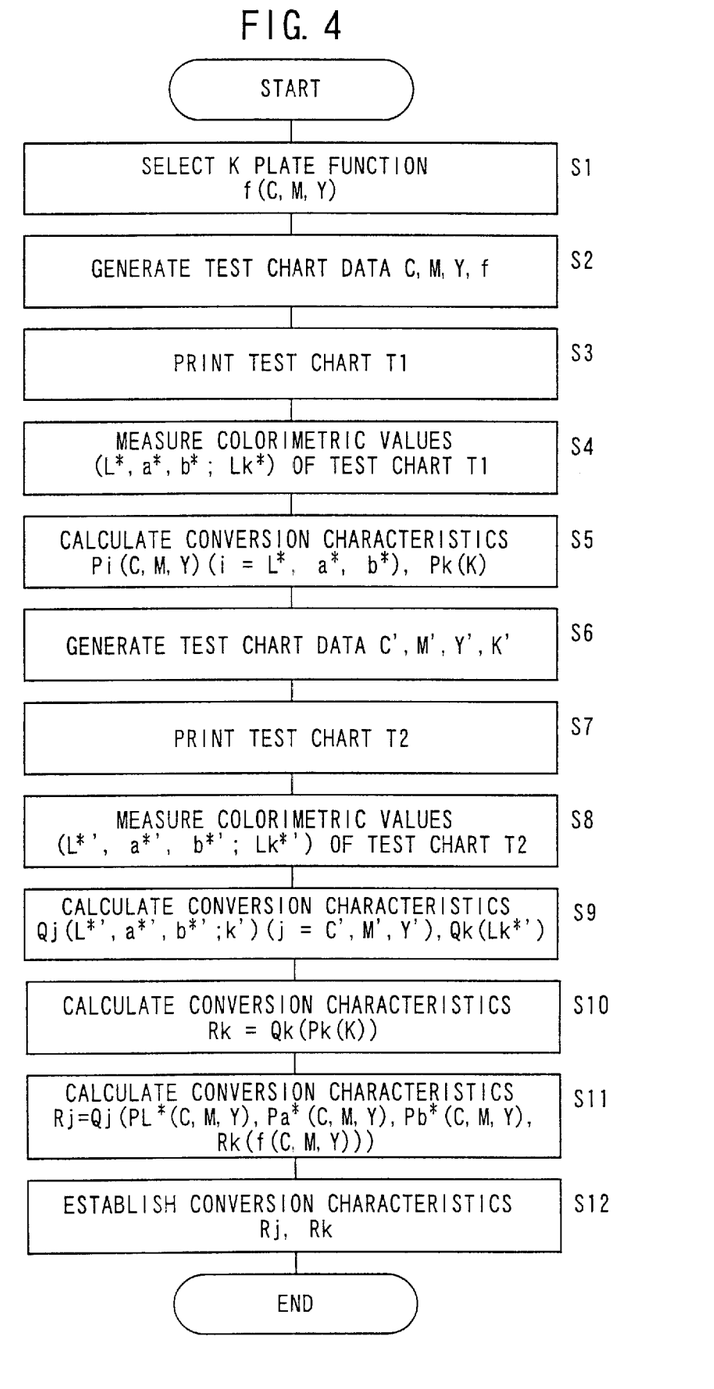
FIG. 4 is a flowchart of a process of generating color conversion data.

A process of generating color conversion data in the system shown in FIGS. 1 through 3 will be described below with reference to FIG. 4.

First, a test chart T1 is generated by the color printing machine 17.

The operator operates the control/display unit 22 of the editing apparatus 12 to select, from the K plate function table 28, a K plate function f(C, M, Y) indicative of the relationship between color image data of C, M, Y and color image data of K, based on the printing conditions and separating conditions, in step S1.

Specifically, the color image data K of the color image data of C, M, Y, K supplied from the color scanner 10 is generally established in a certain relationship with respect to the color image data of the three colors C, M, Y based on the printing conditions and separating conditions. This relationship is represented by the K plate function table 28. For example, according to a UCR (UnderColor Removal) process, if it is assumed that color image data $C_0$, $M_0$, $Y_0$ of C, M, Y prior to being subject to the UCR process have minimum values $Min(C_0, M_0, Y_0)$ and a constant value UCRST, then color image data K after being subject to the UCR process has a parameter Grey that is determined as:

$$\text{Grey} = \text{Max}(\text{Min}(C_0, M_0, Y_0) - \text{UCRST}, 0) \quad (1)$$

where the operator Max indicates selecting either the value $(\text{Min}(C_0, M_0, Y_0) - \text{UCRST}$ or "0" whichever is greater. Using a function G established according to the printing conditions and separating conditions, the color image data K is determined as:

$$K = G(\text{Grey}) \quad (2)$$

Color image data, C, M, Y, K after being subject to the UCR process are determined, using given coefficients $K_C$, $K_M$, $K_Y$, as follows:

$$C = C_0 - k_C \cdot \text{Grey} \quad (3)$$

$$M = M_0 - k_M \cdot \text{Grey} \quad (4)$$

$$Y = Y_0 - k_Y \cdot \text{Grey} \quad (5)$$

$$K = G(\text{Grey}) = f(C, M, Y) \quad (6)$$

Figure 5:
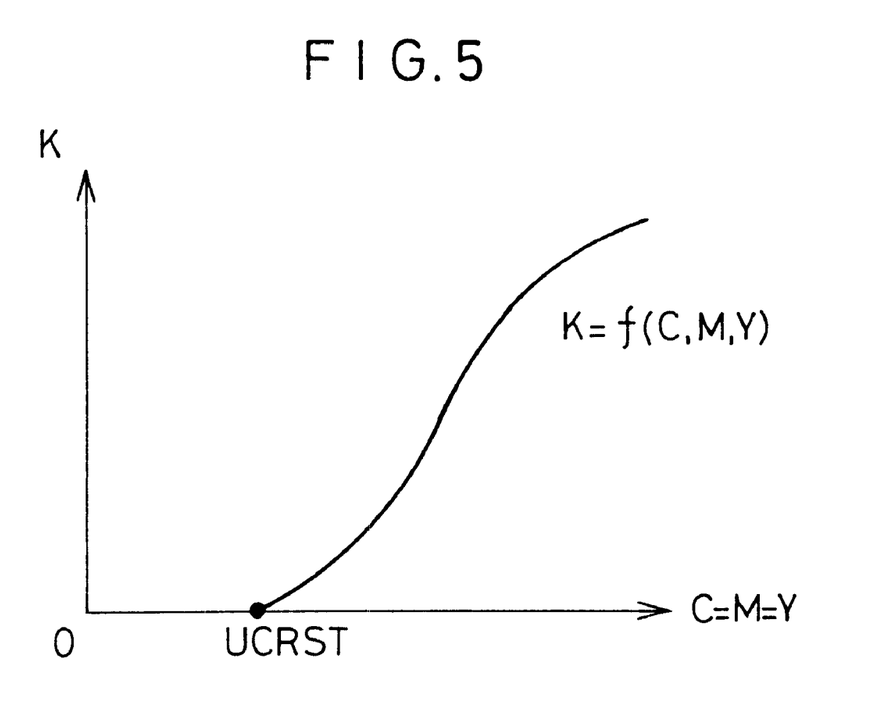
FIG. 5 is a diagram illustrative of a K plate function.

FIG. 5 shows the K plate function f(C, M, Y) thus established, which represents the amount of the color image data K with respect to the color image data C=M=Y.

Then, the test chart data generator 26 generates test chart data of the color image data C, M, Y, K using the K plate function f(C, M, Y) selected from the K plate function table 28 in step S2. The test chart data comprise 7 halftone dot % data at 17% intervals from 0 to 100% for each of the color image data C, M, Y and 21 halftone dot % data at 5% intervals for the color image data K, and hence comprise a total of $7^3 + 21$ test chart data.

The test chart data thus generated are supplied through the data output unit 24 to the platemaking film producing apparatus 14. Based on the supplied test chart data, the platemaking film producing apparatus 14 generates platemaking films A2 for the respective color image data C, M, Y, K. The press plate producing apparatus 16 generates press plates A3 from the platemaking films A2. Using the press plates A3, the color printing machine 17 produces a test chart T1 as shown in FIG. 6 in step S3.

Figure 6:
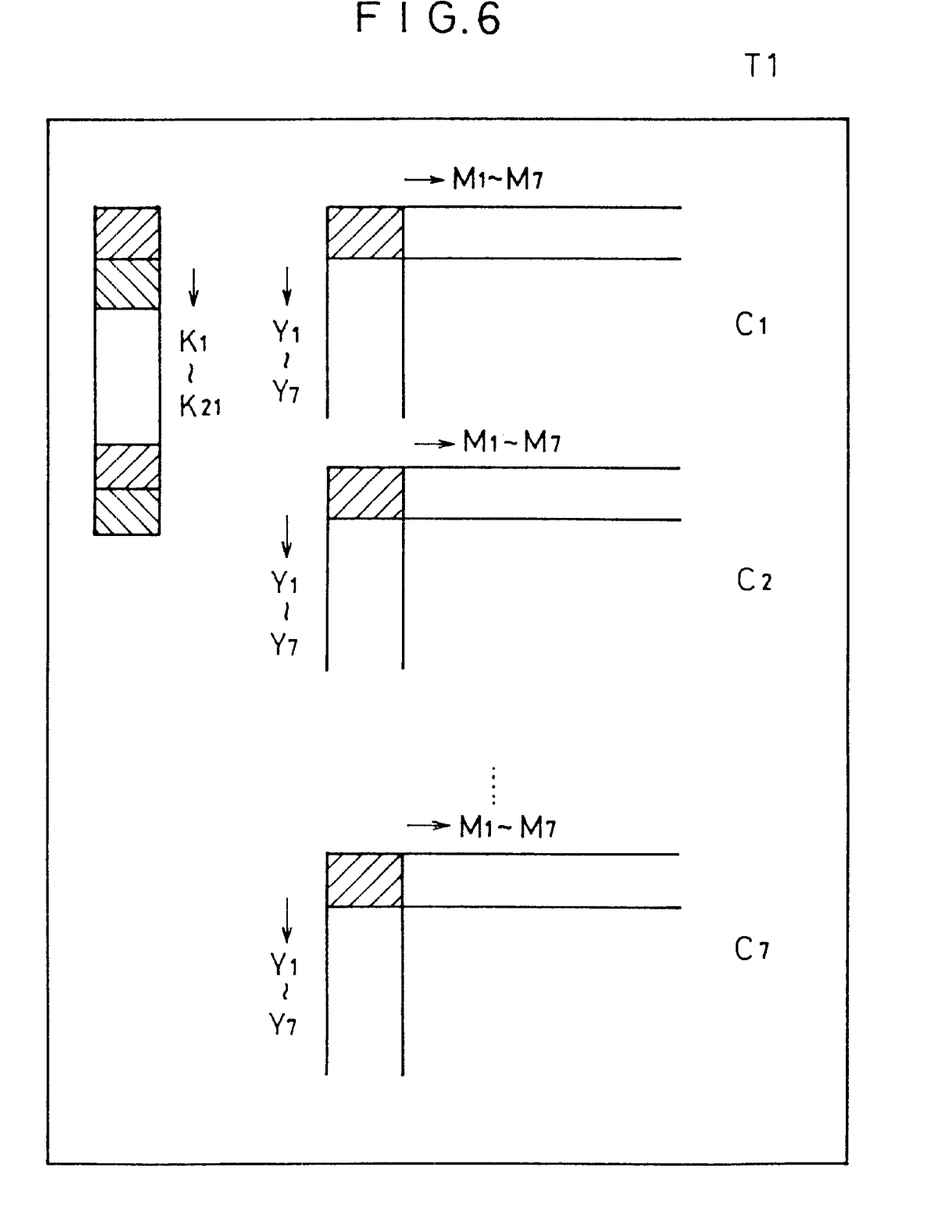
FIG. 6 is a diagram of a test chart.

As shown in FIG. 6, the test chart T1 comprises patches $K_1$–$K_{21}$ of the 21 color image data K at 5% intervals and patches $(C_1, M_1, Y_1)$–$(C_7, M_7, Y_7)$ representing a combination of the $7^3$ color image data C, M, Y determined according to the above equations (3)–(6). The number of the patches contained in the test chart T1 is much smaller than would be if patches were generated from a combination of $7^4$ color image data C, M, Y, K.

The test chart T1 is then measured by a colorimeter for colorimetric values L*, a*, b* of the patches $(C_1, M_1, Y_1)$–$(C_7, M_7, Y_7)$ and colorimetric values Lk* of the patches $K_1$–$K_{21}$ in step S4. Since the number of the patches that make up the test chart T1 is greatly reduced, the time required to measure the colorimetric values of the patches is also greatly reduced.

Three-dimensional conversion characteristics Pi(C, M, Y) (i=L*, a*, b*) (C, M, Y→L*, a*, b*) for converting the color image data C, M, Y of the patches $(C_1, M_1, Y_1)$–$(C_7, M_7, Y_7)$ into their colorimetric values L*, a*, b* are determined, and one-dimensional conversion characteristics Pk(K) (K→Lk*) for converting the color image data K of the patches $K_1$–$K_{21}$ into their colorimetric values Lk* are determined in step S5.

Then, the color printer 18 generates a test chart T2 based on the test chart data of color image data C', M', Y', K'. From the relationship between colorimetric values L*', a*', b*', Lk*' of the test chart T2 and the color image data C', M', Y', K', four-dimensional conversion characteristics Qj(L*', a*', b*', K') (j=C', M', Y', K') (L*', a*', b*', Lk*'→C', M', Y') and one-dimensional conversion characteristics Qk(Lk*') (L*k'→K') are calculated. The four-dimensional conversion characteristics Qj and the one-dimensional conversion characteristics Qk may be calculated before the three-dimensional conversion characteristics Pi and the one-dimensional conversion characteristics Pk are calculated.

More specifically, the test chart data generator 26 generates test-chart data of color image data C', M', Y', K' in step S6, and supplies the generated test chart data through the data switcher 30 to the output unit 34, thereby generating a test chart T2 in step S7. Then, the test chart T2 is measured for colorimetric values L*', a*',b' Lk*' to determine the relationship of the colorimetric values L*', a*',b*', Lk*' with respect to the color image data C', M', Y', K' in step S8. Thereafter, an inverse conversion process is carried out, using the color image data K' as constant, to determine four-dimensional conversion characteristics Qj(L*', a*', b*', K') which represent the relationship of the color image data C', M', Y' with respect to the colorimetric values L*', a*', b*' and the color image data K'. Similarly, one-dimensional conversion characteristics Qk(Lk*') are determined from the colorimetric values Lk* of the test chart T2 obtained from the monochromatic test chart data of the color image data K' in step S9.

Therefore, one-dimensional conversion characteristics Rk(K) (K→K') and three-dimensional conversion characteristics j=Rj (C, M, Y C', M', Y') (j=C', M', Y') for equalizing the colorimetric values L*, a*, b* of the test chart T1 with the calorimetric values L*', a*', b*' of the test chart T2 are determined.

Specifically, the one-dimensional conversion characteristics Rk(K) (K→K') are determined in step S10 as:

$$Rk(K)=Qk(Pk(K)) \quad (7)$$

by combining the one-dimensional conversion characteristics Pk(K) (K→Lk*) determined in step S5 and one-dimensional conversion characteristics Qk(Lk*') (Lk*'→K') determined in step S9. From the equations (7) and (6), $$K'=Rk(K)=Rk(f(C, M, Y)) \quad (8)$$

Consequently, the three-dimensional conversion characteristics Rj(C, M, Y) can be determined in step S11 as:

$$Rj(C, M, Y)=Qj(PL*(C, M, Y), Pa*(C, M, Y), Pb*(C, M, Y), Rk(f(C, M, Y)) \quad (9)$$

by combining the three-dimensional conversion characteristics Pi(C, M, Y) determined in step S5 and the four-dimensional conversion characteristics Qj(L*', a*', b*',K') determined in step S9.

The three-dimensional conversion characteristics Rj(C, M, Y) and the one-dimensional conversion characteristics Rk(K) are stored as color conversion data in the standard color conversion table 38 in step S12. A plurality of three-dimensional conversion characteristics and one-dimensional conversion. characteristics depending on the output principles (e.g., halftone dot modulation or density modulation) of the color printer 18 and the color printing machine 17 are also stored in the standard color conversion table 38.

The printing condition correcting conversion table 36 of the color printer 18 contains color conversion data of color image data C, M, Y, K for printing conditions such as print papers and inks as modified from standard printing conditions, as one-dimensional conversion characteristics Sn(n=C', M', Y', K'). The calibration conversion table 40 of the color printer 18 contains color conversion data for correcting individual characteristics of the color printer 18, the environment in which the color printer 18 is used, and characteristic changes due to aging of the color printer 18, as one-dimensional conversion characteristics Tn(n=C', M', Y', K').

A process of generating a color proof image A5 using the color printer 18 which has the printing condition correcting conversion table 36, the standard color conversion table 38, and the calibration conversion table 40 thus generated will be described below.

The color scanner 10 which has read a desired color subject image A1 to be printed transfers color image data of C, M, Y, K to the editing apparatus 12. In the editing apparatus 12, the image editing processor 20 edits the supplied color image data, and transfers the edited color image data through the data output unit 24 to the color printer 18.

In the color printer 18, the color image data of C, M, Y, K transferred from the editing apparatus 12 are transferred to the color correcting processor 32 by the data switcher 30. The color correcting processor 32 converts the supplied color image data of C, M, Y, K into color image data of C', M', Y', K' based on the color conversion data supplied from the combined conversion table 44. The color image data of C', M', Y', K' are then outputted as a color proof image A5 from the output unit 34.

The combined conversion table 44 contains color conversion data selected from the printing condition correcting conversion table 36, the standard color conversion table 38, and the calibration conversion table 40 and combined by the combining processor 42. Specifically, one-dimensional conversion characteristics Sn of C, M, Y, K depending on printing conditions such as print paper and inks used by the color print A4 are selected from the printing condition correcting conversion table 36. Three-dimensional conversion characteristics Rj of C, M, Y and one-dimensional conversion characteristics Rk of K depending on the output principles of the color printer 18 and the color printing machine 17 are selected from the standard color conversion table 38. One-dimensional conversion characteristics Tn of C, M, Y, K for correcting individual characteristics of the color printer 18, the environment in which the color printer 18 is used, and characteristic changes due to aging of the color printer 18 with respect to standard data are selected from the calibration conversion table 40.

Figure 7:
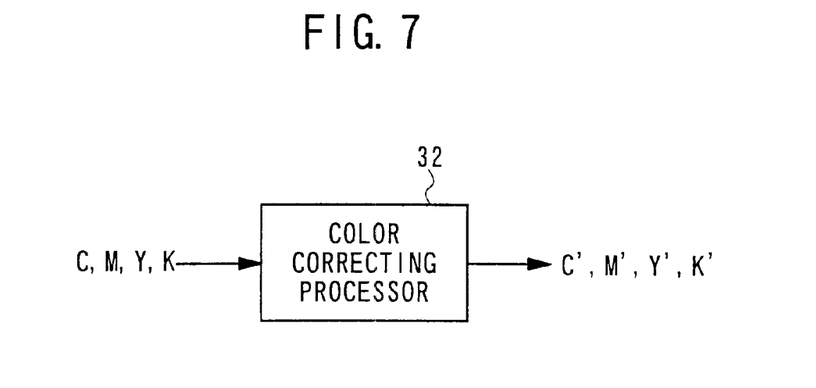
FIG. 7 is a block diagram of a color correcting processor.

These selected conversion characteristics are combined into combined conversion characteristics Sn·Rn·Tn (n=C, M, Y, K) composed of four-dimensional color conversion data for determining color image data of C', M', Y', K' from four-dimensional color image data of C, M, Y, K, for example, and the combined conversion characteristics Sn·Rn·Tn are stored in the combined conversion table 44. Using the combined conversion characteristics Sn·Rn·Tn in the combined conversion table 44, the color correcting processor 32 effects a four-dimensional color correcting process as shown in FIG. 7.

Figure 8:
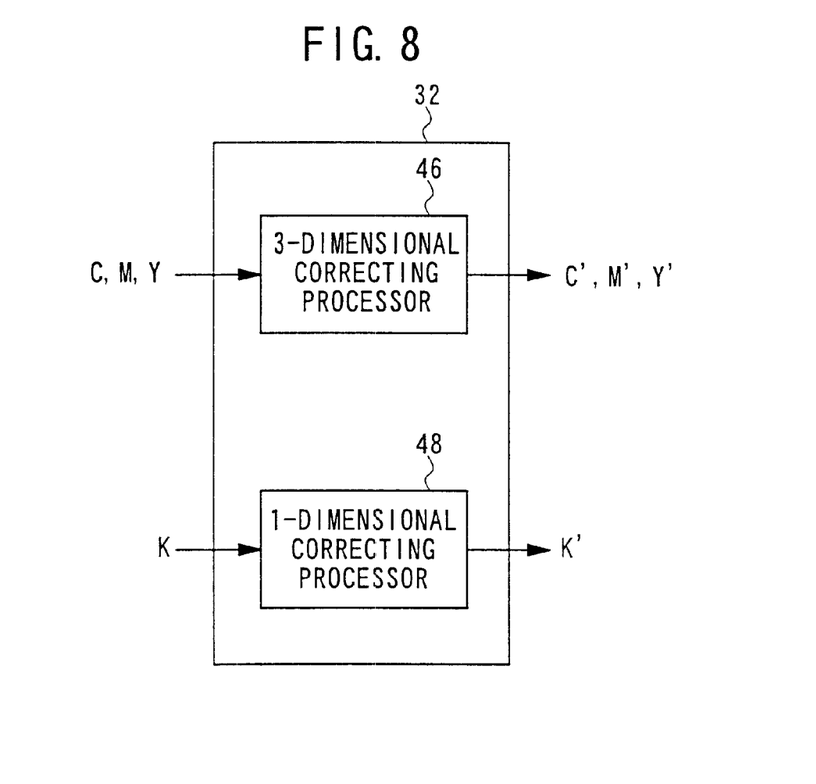
FIG. 8 is a block diagram of another color correcting processor.

Alternatively, combined conversion characteristics Sj·Rj·Tj (j=C, M, Y) for converting three-dimensional color image data of C, M, Y into color image data of C', M', Y' and combined conversion characteristics SK·RK·TK for converting monochromatic color image data of K into monochromatic color image data of K' may be determined and, stored in the combined conversion table 44. As shown in FIG. 8, using the combined conversion characteristics Sj·Rj·Tj, a three-dimensional correcting processor 46 in the color correcting processor 32 may correct C, M, Y into C', M', Y', and a one-dimensional correcting processor 48 in the color correcting processor 32 may correct K into K'. The color correcting processor 32 shown in FIG. 8 can shorten the processing time as it is not necessary to generate four-dimensional color conversion data.

In the above embodiment, the test chart T1 is generated using the K plate function f(C, M, Y, K) stored in the K plate function table 28 of the editing apparatus 12. However, the K plate function f(C, M, Y, K) which has been prepared in advance may not necessarily be able to cope with all separating conditions. To eliminate such a drawback, a plurality of K plate functions $K1=f_1(C, M, Y)$ and $K2=f_2(C, M, Y)$ are prepared, and conversion characteristics $Rj_1$, $Rk_1$, and $Rj_2$, $Rk_2$ are determined from the K plate functions K1, K2 as in steps S10, S11. An actual value of K is represented as $K=K_{real}$, and a parameter t expressed by:

$$t=(K_{real}-K1)/(K2-K1) \quad (10)$$

is determined. Using the parameter t, color conversion data expressed by:

$$C'=(1-t) \cdot RC'_1 + t \cdot RC'_2 \quad (11)$$

$$M'=(1-t) \cdot RM'_1 + t \cdot RM'_2 \quad (12)$$

$$Y'=(1-t) \cdot RY'_1 + t \cdot RY'_2 \quad (13)$$

$$K'=(1-t) \cdot Rk'_1 + t \cdot Rk'_2 \quad (14)$$

are established. It is possible to effect a highly accurate color conversion process depending on arbitrary separating conditions based on these color conversion data.

Although certain preferred embodiments of the present invention have been shown and described in detail, it should be understood that various changes and modifications may be made therein without departing from the scope of the appended claims.

What is claimed is:

1. A method of generating color conversion data to convert color image data C, M, Y, K which are used to produce a printed material into color image data C', M', Y', K' which are used in a color output apparatus to equalize the colors of the printed material with the colors of a color image produced by the color output apparatus, comprising the steps of:

establishing a relationship K=f(C, M, Y) for determining color image data K from image data C, M, Y;

determining color conversion data to equalize colors of a printed material based on color image data C, M, Y, f(C, M, Y) with colors of a color image outputted by said color output apparatus based on color image data C', M' Y', K';

determining one-dimensional color conversion characteristics K'=Rk(K) to equalize colors of a printed material based on monochromatic color image data K with colors of a color image outputted by said color output apparatus based on monochromatic colors image data K';

determining three-dimensional color conversion characteristics j=Rj(C, M, Y) (j=C', M', Y') to convert the color image data C, M, Y into the color image data C', M', Y' to equalize colors of a printed material based on color image data C, M, Y, f(C, M, Y) with colors of a color image outputted by said color apparatus based on color image data C', M', Y', Rk(f(C, M, Y));

converting color image data C, M, Y, K into color image data C', M', Y', K' using color conversion data of said three-dimensional color conversion characteristics j=Rj (C, M, Y) (j=C', M', Y') and said one-dimensional color conversion characteristics K'=Rk(K);

establishing a relationship $K1=f_1(C, M, Y)$ to determine color image data K1 and a relationship $K2=f_2(C, M, Y)$ to determine color image data K2, the color image data K1, K2 being related to color data image $K_{real}$ according to a relationship $K1<K_{real}<K2$;

determining three-dimensional color conversation characteristics $j_1=Rj_1(C, M, Y)$ ($j_1=C', M', Y'$) to convert color image data C, M, Y, $f_1(C, M, Y)$ into color image data C', M', Y';

determining three-dimensional color conversion characteristics $j_2=Rj_2(C, M, Y)$ ($j_2=C', M', Y'$) to convert color image data C, M, Y, $f_2(C, M, Y)$ into color image data C', M', Y';

determining one-dimensional color conversion characteristics $K'=Rk_1(K1)$ to convert color image data K1 into color image data K';

determining one-dimensional color conversion characteristics $K'=Rk_2(K2)$ to convert color image data K2 into color image data K'; and determining three-dimensional color conversion characteristics j=Rj (C, M, Y) (j=C', M', Y') and one-dimensional color conversion characteristics K'=Rk (K) according to:

$$j=Rj(C, M, Y)=(1-t) \cdot Rj_1 + t \cdot Rj_2$$

$$K'=Rk(K)=(1-t)Rk_1 + t \cdot Rk_2$$

where t is a parameter expressed by $t=(K_{real}-K1)/(K2-K1)$.

2. A method of generating color conversion data to convert color image data C, M, Y, K which are used to produce a printed material into color image data C', M', Y', K' which are used in a color output apparatus to equalize the colors of the printed material with the colors of a color image produced by the color output apparatus, comprising the steps of:

establishing a relationship K=f(C, M, Y) for determining color image data K from color image data C, M, Y;

determining color conversion data to equalize colors of a printed material based on color image data C, M, Y, f(C, M, Y) with colors of a color image outputted by said color output apparatus based on color image data C', M', Y', K'; and generating a test chart T1 based on said color image data C, M, Y, f(C, M, Y) and said color image data K, and determining colorimetric values L*, a*, b*, Lk* of the test chart T1;

generating a test chart T2 with said color output apparatus based on said color image data C', M', Y', K' and said color image data K', and determining calorimetric values L*', a*', b*', Lk*' of the test chart T2; and determining color conversion data to equalize said colorimetric values L*, a*, b*, Lk* with said calorimetric values L*', a*', b*', Lk*'.

3. A method of generating color conversion data to convert color image data C, M, Y, K which are used to produce a printed material into color image data C', M', Y', K' which are used in a color output apparatus to equalize the colors of the printed material with the colors of a color image produced by the color output apparatus, comprising the steps of:

establishing a relationship K=f(C, M, Y) for determining color image data K from color image data C, M, Y;

determining color conversion data to equalize colors of a printed material based on color image data C, M, Y, f(C, M, Y) with colors of a color image outputted by said color output apparatus based on color image data C', M', Y', K'; and generating a test chart of the color image data C, M, Y, K using a K plate function f(C, M, Y) comprising halftone dot percent data at percent intervals for each of the color image data C, M, Y and halftone dot percent data at percent intervals for the color image data K wherein the percent intervals for data K are less than the percent intervals for the color image data C, M, Y.

4. An apparatus for generating color conversion data to convert color image data C, M, Y, K which are used to produce a printed material into color image data C', M', Y', K' which are used in a color output apparatus to equalize the colors of the printed material with the colors of a color image produced by the color output apparatus, comprising:

first conversion characteristics holding means for holding three-dimensional color conversion characteristics j=Rj (C, M, Y) (j=C', M', Y'), established based on a relationship K=f(C, M, Y) for determining color image data K from color image data C, M, Y, to convert color image data C, M, Y, f(C, M, Y) into color image data C', M', Y';

second conversion characteristics holding means for holding one-dimensional color conversion characteristics K'=Rk(K) to convert color image data K into color image data K';

converting means for converting color image data C, M, Y, K into color image data C', M', Y', K' using color conversion data of said three-dimensional color conversion characteristics j=Rj(C, M, Y) and said one-dimensional color conversion characteristics K'=Rk(K); and a test chart of the color image data C, M, Y, K using a K plate function f(C, M, Y) comprising halftone dot percent data at percent intervals for each of the color image data C, M, Y and halftone dot percent data at percent intervals for the color image data K wherein the percent intervals for data K are less than the percent intervals for the color image data C, M, Y.

5. A method of generating color conversion data to convert color image data C, M, Y, K which are used to produce a printed material into color image data C', M', Y', K' which are used in a color output apparatus to equalize the colors of the printed material with the colors of a color image produced by the color output apparatus, comprising the steps of:

establishing a relationship K=f(C, M, Y) for determining color image data K from color image data C, M, Y;

determining color conversion data to equalize colors of a printed material based on color image data C, M, Y, f(C, M, Y) with colors of a color image outputted by said color output apparatus based on color image data C', M', Y', K'; and generating a test chart T1 based on said color image data C, M, Y, f(C, M, Y) and said color image data K and determining a first set of calorimetric values of the test chart T1;

generating a test chart T2 with said color output apparatus based on said color image data C', M', Y', K' and said color image data K' and a second set of determining calorimetric values of the test chart T2; and determining color conversion data to equalize said first and second set of calorimetric values.

6. An apparatus for generating color conversion data to convert color image data C, M, Y, K which are used to produce a printed material into color image data C', M', Y', K' which are used in a color output apparatus to equalize the colors of the printed material with the colors of a color image produced by the color output apparatus, comprising:

first conversion characteristics holding means for holding three-dimensional color conversion characteristics j=Rj (C, M, Y) (j=C', M', Y'), established based on a relationship K=f(C, M, Y) for determining color image data K from color image data C, M, Y, to convert color image data C, M, Y, f(C, M, Y) into color image data C', M', Y';

second conversion characteristics holding means for holding one-dimensional color conversion characteristics K'=Rk(K) to convert color image data K into color image data K';

converting means for converting color image data C, M, Y, K into color image data C', M', Y', K' using color conversion data of said three-dimensional color conversion characteristics j=Rj(C, M, Y) and said one-dimensional color conversion characteristics K'=Rk (K); and means for generating a test chart T1 based on said color image data C, M, Y, f(C, M, Y) and said color image data K and determining a first set of calorimetric values of the test chart T1;

means for generating a test chart T2 with said color output apparatus based on said color image data C', M', Y', K' and said color image data K' and a second set of determining calorimetric values of the test chart T2; and means for determining color conversion data to equalize said first and second set of calorimetric values.

7. The apparatus of claim 6, wherein said first and second set of colorimetric values comprise L*a*b* values.

* * * * *